United States Patent [19]

Jones

[11] Patent Number: 5,075,797

[45] Date of Patent: Dec. 24, 1991

[54] COOLED MOSAIC WINDOW

[75] Inventor: Nelson E. Jones, Huntington Beach, Calif.

[73] Assignee: McDonnell Douglas Corporation, Long Beach, Calif.

[21] Appl. No.: 557,598

[22] Filed: Jul. 2, 1990

[51] Int. Cl.⁵ .............................................. G02B 5/00
[52] U.S. Cl. .................................... 359/350; 359/885; 102/213; 244/3.16; 250/203.6; 250/216
[58] Field of Search .................. 350/1.1, 1.2, 1.5, 267, 350/3.9, 584, 610; 165/9.3, 9.4; 102/213, 293; 244/3.16; 264/1.2; 501/40; 250/203.6, 216

[56] References Cited

U.S. PATENT DOCUMENTS

| | | | |
|---|---|---|---|
| 4,900,914 | 2/1990 | Raff et al. | 250/216 |
| 4,956,037 | 9/1990 | Vivaldi | 350/610 |
| 4,970,403 | 11/1990 | Krasutsky | 250/216 |
| 5,004,319 | 4/1991 | Smither | 350/610 |

Primary Examiner—Bruce Y. Arnold
Assistant Examiner—J. P. Ryan
Attorney, Agent, or Firm—Donald E. Stout; John P. Scholl; Gregory A. Cone

[57] ABSTRACT

A process and resulting structure for a window typically used on weapons with infrared sensors. The window has a plurality of transparent blocks connected in a mosaic pattern. Between the blocks are slots, that allow a coolant to flow through and cool the window, such that the window does not have a thermal signature.

11 Claims, 3 Drawing Sheets

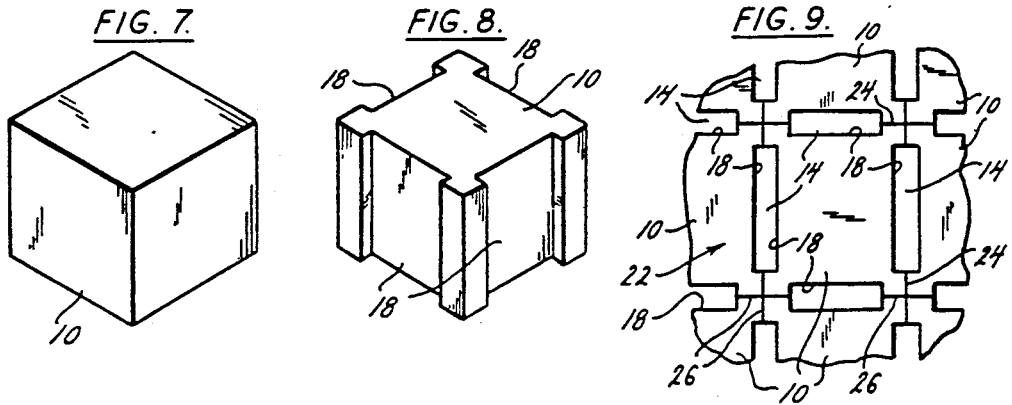
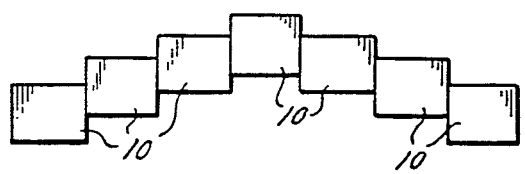
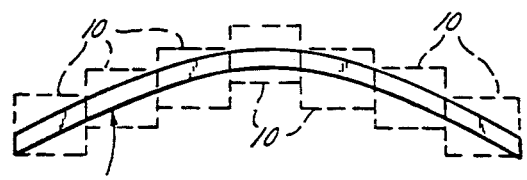
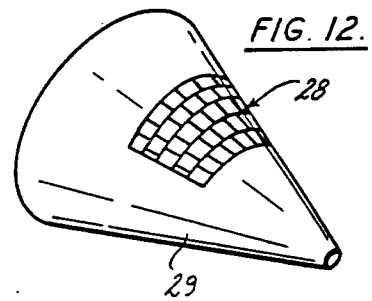
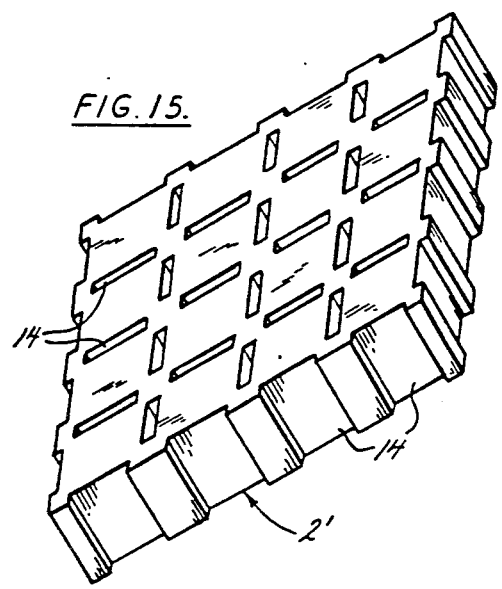
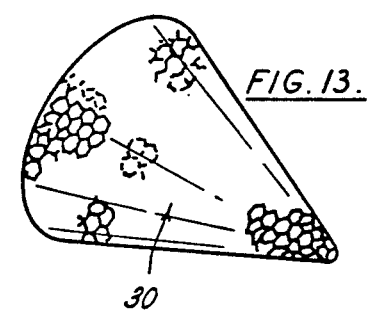

COOLED MOSAIC WINDOW

BACKGROUND OF THE INVENTION

Optical sensors for weapons, must be able to observe the flight path and targets while operating in extreme flight environments. Typically, the weapons are constructed with a window that protects the sensors, while allowing the sensors to detect infrared (IR). As a weapon is travelling through air, heat is generated at the window. This heat creates an IR signature that "masks off" incoming IR information. It is therefor necessary that the window be cooled.

One method of cooling the window includes blowing a coolant across the face of the window. To insure that the window temperature is brought within working limits, a large cooling system is required to provide the velocity and quantity of coolant to cool the window. This system is large and heavy, reducing the overall effectiveness of the weapon.

Another cooling concept is to have a mosaic window, wherein transparent blocks are attached to a metal grid. The metal grid provides structural support for the blocks. Between the metal and the blocks are slots that allow coolant to flow through and cool the window. The resultant window provides a more efficient cooling system. Although the window is cooled, the sensor must look through the metal grid, which will reflect any incoming IR. Additionally, there are requirements that the window have a contoured surface. One process for creating such a window, is to attach the mosaic blocks and then grind the blocks and metal to the desired shape. During the grinding step, the metal tends to "smear" or deform into the slots, preventing or restricting the coolant from flowing through the slots. Thus what is needed is an efficiently cooled window that is capable of being formed into contour shapes.

SUMMARY OF INVENTION

This invention is a process and resulting structure for a window, having a plurality of transparent blocks rigidly connected, wherein the blocks have openings or slots that allow a coolant to flow through and cool the window. The window can be constructed by etching a cooling channel into each transparent block and bonding or attaching the blocks into a mosaic pattern. The plurality of channels provides a thermally efficient cooling system that controls the window temperature to within a working limit. The lack of a metallic grid allows the sensors to detect all incoming IR, while having the structural integrity to environmentally protect the sensors.

The attached blocks can be ground and polished into any shape, without disturbing the effectiveness of the channels. This feature is particularly important for windows used on the nose of a missile, wherein the window must have a contour shape.

Therefore it is an object of this invention to provide an efficiently cooled window entirely pervious to infrared or other frequencies of light.

It is also an object of this invention to provide an efficiently cooled window entirely pervious to infrared or other frequencies of light, with the structural integrity to environmentally protect a sensor.

It is also an object of this invention to provide an efficiently cooled window entirely pervious to infrared or other frequencies of light, that can be constructed into contour shapes.

DETAILED DESCRIPTION OF THE DRAWINGS

The objectives and advantages of this invention will become more apparent to those skilled in the art after reviewing the following specification and drawings, wherein:

FIG. 7 is a perspective view of a block;

FIG. 8 is the block of FIG. 7 with a plurality of slots formed on the sides of the block;

FIG. 9 is sectional top view of a plurality of blocks connected in a mosaic pattern;

FIG. 10 is a side view of a plurality of blocks, connected in a staggered form;

FIG. 11 is a side view similar to FIG. 10, wherein the blocks have been grounded into a contour shape;

FIG. 12 is a perspective view of a mosaic window with a radius of curvature, attached to the nose of a missile;

FIG. 13 is a perspective view of a cone shaped mosaic window;

FIG. 15 is a perspective view of a section of a solid window with a plurality of cooling channels formed throughout the window.

DETAILED DESCRIPTION OF THE INVENTION

Figure 1:
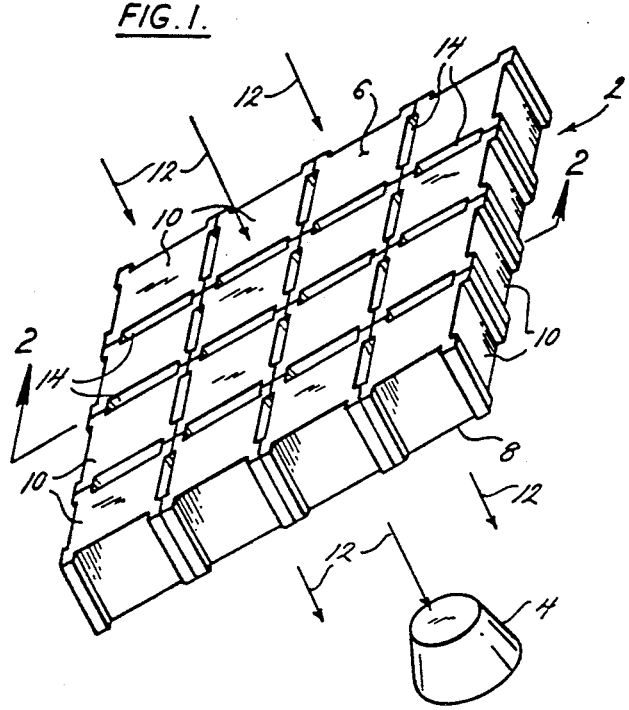
FIG. 1 is a perspective view of a sensor and a section of a mosaic window, wherein the mosaic window has a plurality of cooling channels.

Referring to the drawings more particularly by reference numbers, number 2 in FIG. 1 is a window 2 that protects a sensor 4. The window 2 has a first 6 and second 8 surface. The window 2 can be constructed from a plurality of connected blocks 10. The blocks 10 can be any shape that will nest, including but not limited to, squares, rectangles, diamonds or hexagons. The blocks 10 can be made from any material, such as glass, quartz, sapphire or plastic, that is pervious to the information 12 to be sensed, whether it be visible light, infrared, radar or X-rays.

Figure 2:
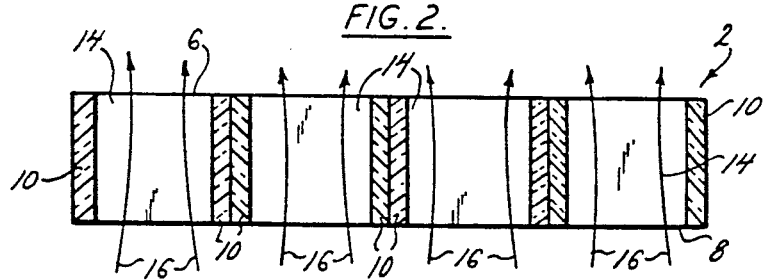
FIG. 2 is a cross-sectional view of the mosaic window taken at line 2—2 of FIG. 1.

Between the blocks 10 are cooling channels 14. As shown in FIG. 2 the channels 14 provide a path for a cooling medium 16 to flow across and cool the blocks 10. The cooling medium 16 should preferably be an inert gas, to insure that there is no liquid to refract incoming IR or visible light. This construction of flow paths allows each individual block 10 to be cooled, which provides a higher overall heat transfer rate, than a system wherein the cooling medium 16 is blown across the leading edge of the window 2. It has been calculated that a mosaic window requires one-third the volume of coolant of a window where the leading edge is cooled. This provides valuable weight savings, that is especially important in missile design. This cooling approach also creates a more isothermal temperature gradient throughout the window 2.

Figure 3:
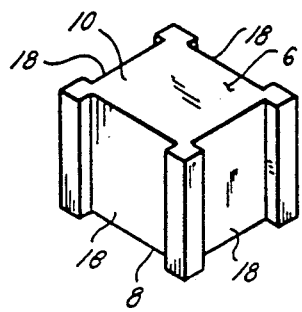
FIG. 3 is a perspective view of a block with slots.
Figure 5:
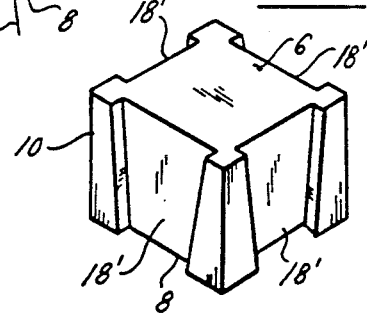
FIG. 5 is a block similar to the block in FIG. 3, wherein the slots have a taper in width.
Figure 4:
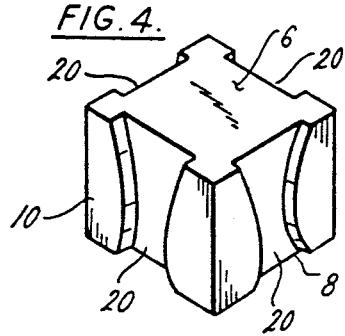
FIG. 4 is a block similar to the block in FIG. 3, wherein the slots are shaped as a nozzle.
Figure 6:
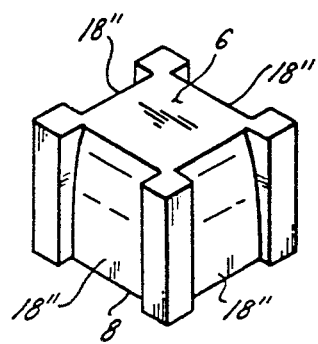
FIG. 6 is a block similar to the block in FIG. 3, wherein the slots vary in depth.

The channels 14 may be slots 18 formed on the sides of each block 10, see FIG. 3. FIGS. 4–6 show different variations of the slots 18. FIG. 4 shows a converging nozzle 20 arrangement for subsonic flow. A diverging nozzle configuration for supersonic flow could also be used. FIGS. 5 and 6 show slots 18 of varying widths 18' and depths 18", respectively, wherein the widths 18' and depths 18" of the slots 18 increase as the slots 18 approach the first surface 6. The exact shape and dimensions of the slots 18 can be designed to provide the maximum heat transfer characteristic, in accordance with the environment and the system provided.

The preferred process for constructing the window 2 is shown in FIGS. 7-9. FIG. 7 shows an individual block 10. FIG. 8 shows slots 18 that can then be etched into the blocks 10, by means such as a chemical bath. A maskant (not shown) can be applied prior to the etch to control and define the areas of the slots 18. Alternatively the slots 18 could be cut or ground from the blocks 10. As another method the blocks 10 could be cast from a mold, with the slots 18 formed into the blocks 10.

Figure 14:
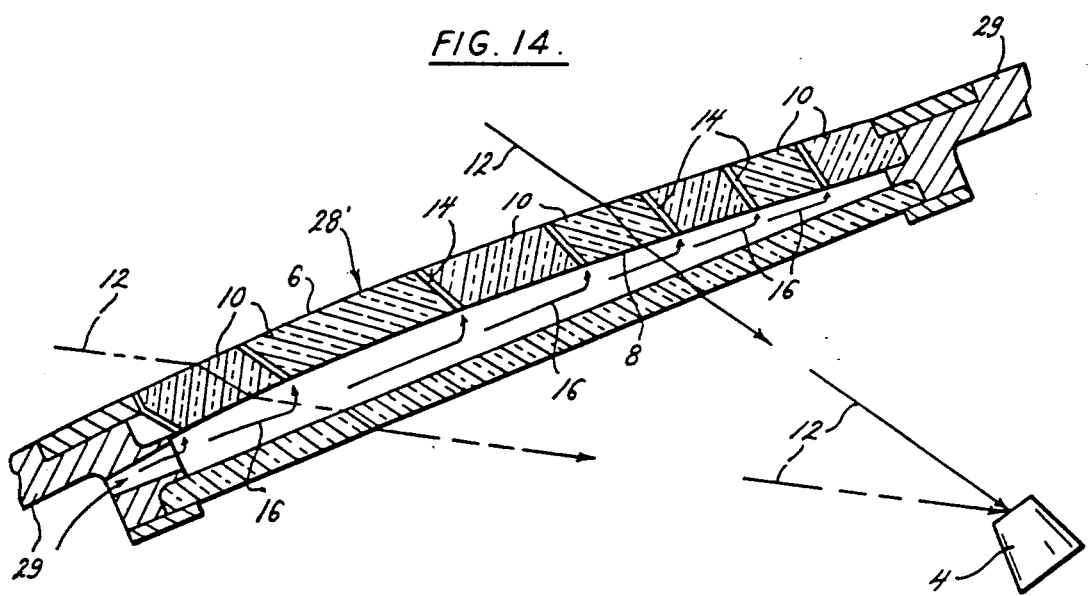
FIG. 14 is a cross sectional view of a window with a compound radius of curvature attached to a missile, wherein light is refracted through the window to a sensor, while the window is cooled by a cooling medium.

As shown in FIG. 9 the blocks 10 are then attached into a mosaic pattern 22. To attach the blocks 10, a contact means 24 can be applied to the contact surfaces 26 of the blocks 10. The contact means 24 can be but is not limited to an adhesive or a frit. The blocks 10 are then placed into the mosaic pattern 22. If a frit is used the mosaic pattern of blocks 22 is then heated until the frit bonds to the blocks 10. The blocks 10 are then cooled, wherein the attached blocks 10 form the window 2. If a pressure sensitive adhesive is used, a lateral pressure would then be applied. The window 2 can then be ground and polished into the desired thickness and finish. FIG. 10 shows a cross section of the blocks 10 attached in a staggered form. This allows the window 2 to be ground such that it has a radius of curvature 28, see FIG. 11. This is particularly important for use on a missile, where the window must conform to the shape of the nose of the vehicle. FIGS. 12 and 13, show a curved window 28 attached to a missile 29 and a conical window 30, respectively. The window 2 as shown in FIG. 12 can have a compound curvature 28', see FIG. 14. The radius is such that the refraction angle of light 12 varies through different blocks 10, such that the light 10 is directed toward the sensor 4 as shown in FIG. 14. FIG. 14 also shows the efficient cooling method, of blowing the cooling medium 16 across the second surface 8 of the window and through the cooling channels 14.

An alternate process for constructing the window 2 is to take a solid window 2' and etch or drill the slots 18 into the window 2', see FIG. 15. The window 2 could be ground, before or after the slot 18 forming step, into a predetermined shape including but not limited to the contour or conical shapes shown in FIGS. 12-14.

While certain exemplary embodiments of this invention have been described above and shown in the accompanying drawings, it is to be understood that such embodiments are merely illustrative of, and not restrictive on, the broad invention. The invention is not to be limited by the specific constructions, materials suggested or arrangements shown and described, since various other modifications may occur to persons having ordinary skill in the art.

What is claimed is:

1. A window cooled by a cooling medium, comprising: a transparent member having a first surface and a plurality of cooling channels adapted to allow the cooling medium to flow through said cooling channels, said cooling channels being substantially perpendicular to said first surface.

2. The window as recited in claim 1, wherein the window has a radium of curvature.

3. A window cooled by a cooling medium, wherein the window has a first surface, comprising: a plurality of blocks each having at least one contacting surface, said blocks being interconnected at said contacting surfaces in a mosaic pattern, said mosaic pattern of blocks having a plurality of cooling channels adapted to allow the cooling medium to flow through said cooling channels.

4. The window as recited in claim 3, wherein said blocks are pervious to infrared.

5. The window as recited in claim 4, wherein the depth of said slots increases as said slot approaches the first surface.

6. The window as recited in claim 3, wherein said cooling channels are slots between said contacting surfaces.

7. The window as recited in claim 6, wherein the width of said slots increases as it approaches the first surface.

8. The window as recited in claim 3, wherein said cooling channels are nozzles.

9. The window as recited in claim 3, wherein said mosaic pattern of blocks has a radius of curvature.

10. The window as recited in claim 3, wherein said mosaic pattern of blocks has a compound radius of curvature.

11. The window as recited in claim 3, wherein said mosaic pattern of blocks is conical in shape.

* * * * *